United States Patent [19]

Levinson et al.

[11] 4,315,034

[45] Feb. 9, 1982

[54] VEGETABLE PROTEIN PRODUCT AND PROCESS

[75] Inventors: Arthur A. Levinson; Kenneth B. Basa, both of Cook, Ill.

[73] Assignee: National Can Corporation, Chicago, Ill.

[21] Appl. No.: 128,963

[22] Filed: Mar. 10, 1980

Related U.S. Application Data

[60] Continuation of Ser. No. 631,582, Nov. 13, 1975, abandoned, which is a division of Ser. No. 405,201, Oct. 10, 1973, Pat. No. 3,966,977, which is a continuation-in-part of Ser. No. 60,764, Aug. 3, 1970, abandoned.

[51] Int. Cl.³ .............................. A23L 1/20; A23J 3/00
[52] U.S. Cl. .................................... 426/104; 426/656; 426/430; 426/431; 426/459; 426/802; 426/805
[58] Field of Search ............... 426/104, 656, 802, 431, 426/634, 516, 459, 430, 805

[56] References Cited

U.S. PATENT DOCUMENTS 3,142,571 7/1964 McAnelly ........................ 426/656 X
3,480,442 11/1969 Atkinson ............................ 426/448
3,485,636 12/1969 Hoffman ........................ 426/802 X
3,496,858 2/1970 Jenkins ............................ 426/802 X
3,620,755 11/1971 Hoffman ........................ 426/634 X Primary Examiner—Esther M. Kepplinger
Attorney, Agent, or Firm—Neuman, Williams, Anderson & Olson

[57] ABSTRACT

A process for producing a soybean and other vegetable protein based food product having an enhanced protein content and the texture and mouth feel of meat and other chewy foods which comprises contacting a compacted, defatted, vegetable protein containing seed meal material with water at a pH ranging from about 2.0 to about 6.5 at elevated temperatures and superatmospheric pressures for a time sufficient to extract a substantial amount of the non-proteinaceous solubles and increase the protein content thereof while essentially maintaining the structural integrity of the starting material, recovering the product from the aqueous liquor and reducing the moisture content thereof to produce a porous product.

49 Claims, 2 Drawing Figures

VEGETABLE PROTEIN PRODUCT AND PROCESS

CROSS REFERENCE TO RELATED APPLICATIONS

This is a continuation of application Ser. No. 631,582, filed Nov. 13, 1975, now abandoned which, in turn, is a division of application Ser. No. 405,201, filed Oct. 10, 1973, now U.S. Pat. No. 3,966,977 which, in turn, is a continuation-in-part of application Ser. No. 60,764, filed Aug. 3, 1970 now abandoned.

BACKGROUND OF THE INVENTION

1. Field of the Invention

This invention relates to a process for producing a fibrous or meat-like food product by treatment of a vegetable protein containing seed meal material under controlled conditions of heat, pressure and pH.

2. Description of the Prior Art

The prior art disclosed that fibrous meat-like products are produced from soy protein by forming an alkaline solution of soy protein from a defatted, dehulled soybean meal or grit. The alkaline soy protein solution is then commonly extruded from spinnerettes into a coagulating bath containing salt and having a pH on the acid side. The fibers formed by this procedure are frequently accumulated into a tow and the tows combined to make a larger unit. The fibers in this tow are customarily oriented in the same direction to simulate the normal fiber and grain texture of meat. The tows may be impregnated with fats, spices, other proteins, flavors, etc. Frequently, they are then cooked and cut. One of the problems associated with the use of regenerated soy protein is that the use of strongly alkaline solutions in the process results in hydrolysis and loss of some protein and the final product is characterized by a lowered food protein efficiency ratio.

The prior art also discloses the treatment of soybean meal to remove odors by contacting a dehulled, defatted soybean meal with certain protonic acids, limited amounts of moisture (water), low temperatures and short periods of time. (See U.S. Pat. No. 3,361,574).

It is also known to produce soybean based food products which are essentially cellular or expanded in character. These products are obtained by a variety of processes which include as a principal step the heating of a soybean based dough containing moisture at elevated temperatures and pressures followed by the sudden release of pressure which permits trapped moisture in the product then under pressure, to expand and produce numerous elongated cells which are oriented in the product. The final product may be characterized as popped or exploded. (See Atkinson U.S. Pat. No. 3,488,770).

SUMMARY OF THE INVENTION

This invention relates to a process for producing a vegetable protein seed meal based food product having the texture and mouth feel of meat and being characterized as relatively free from off-tastes and odors which comprises contacting a compacted, defatted, vegetable protein containing seed meal product with water at a pH ranging from about 2.0 to about 6.5, at temperatures of above about 105° C. and at superatmospheric pressures, for a time sufficient to extract a substantial amount of essentially non-proteinaceous components and enhance the protein content of the starting material, recovering the thus treated product from the resulting aqueous liquor and reducing the moisture content of the product.

The starting materials used in this invention are compacted, defatted vegetable protein containing seed meal materials which have been subjected to mastication and extrusion under high pressures and temperatures above the boiling point of water. Such vegetable protein based seed meals, i.e., oil seed meals, include products such as soybean meal, cottonseed meal, sunflower seed meal and peanut meal, of which soybean meal is the most preferred. It is also preferred to use meals which have been defatted and dehulled. This compacting operation is customarily carried out by the use of high pressure extruder-plasticator machinery such as an Anderson machine, manufactured by the V. D. Anderson Company of Cleveland, or expellers such as manufactured by the Fujika Company, Limited, of Tokyo. These machines are used to compact and compress a soybean grit (defatted and dehulled). They commonly employ a screw compression chamber which subjects the grit to ever increasing pressure. Some of these machines are called expeller-expanders, but the expression "expander" is employed to designate only a partial release of pressure while still in the screw-compression chamber and does not produce cellularity to any appreciable degree. The pressures employed for compaction in these machines range from about 2,000 to 5,000 pounds per square inch and the temperatures (usually friction generated) are over 100° C. The most preferred procedure permits moisture in the defatted, dehulled soybean grit, flake or meal (3 to 12 or 14%) to be converted to steam and thereby debitter the soy product and also toast the same. The preferred procedure for preparation of the starting material is set out in Levinson U.S. Pat. No. 2,162,729 which teaches the preparation of a compacted, plasticized disembittered product which is toasted without scorching. A product of this type is sold under the trademark TEXTRASOY by H. B. Taylor Company, Chicago, Ill. a division of National Can Corporation.

When the starting material employed is a defatted, dehulled soybean meal it may be further characterized as a compacted, defatted soybean meal product having a density of about 1.36 to 1.40 grams per cubic centimeter and preferably from about 1.37 to 1.39 g./cc. This is contrasted with a normal density for a defatted soybean meal of from about 1.29 to 1.30 g./cc. The compacted soybean product after treatment by the process of the present invention has a density of from about 0.47 to about 0.7 g./cc. with an average of about 0.58 to 0.60 g./cc. The figures are bulk density values for the porous soybean product in chunk form.

In the most preferred form of this invention the starting material is in the form of chips or shards which may range from 4–10 mesh (U.S. Standard Sieve Series) to about ¼ to ½ inch in thickness and have length and width of from ½ to 2 or 3 inches. These chips or shards are characterized in the most preferred form as having a skin on one surface thereof produced by machine action and heat. The skin is a somewhat denser structure than the remainder of the piece and is believed to be slightly denatured. The process of the present invention while producing a swelling of the compacted soy (or other proteinaceous vegetable material) product in a direction essentially normal to the direction of the skin surface does not appreciably affect the skin portion or alter its dimensions. During processing the compacted starting material swells in the manner indicated from about 40 to 85% of its original height. The skin portion which maintains its tough chewy character after processing aids in holding the soy product together as a unified piece during further processing. Even when the products of this invention are comminuted, the skin represents a certain proportion of the final comminuted product which has the tough fibrosity of meat and adds to the total impression of a fibrous, chewy ground meat product. The so-called skin portion represents a layer of usually no more than about 1/16 of an inch and 1/32 to 1/64 of an inch or less is more common. The thickness of this skin portion is, of course, dependent somewhat on the conditions of temperature and pressure employed in the compaction (extrusion) process.

The process, as indicated above, is carried out by contact of the compacted soy product with water under varying conditions of pH ranging from about 2.0 to about 6.5. Preferably, the pH will range from about 2.3 to about 6.5. It has been determined that at lower pH's the product produced is tougher and at the higher pH's in the acidic range the product is somewhat softer. At pH's in the alkaline range, excessive softness occurs together with the production of "off" odors and flavors due to the attack of the alkaline solution on the protein. These alkaline conditions should therefore be avoided. The most preferred range of pH is from about 2.5 to about 4.8.

The acids employed in the process of this invention are preferably those which are acceptable for processing in the food industry such as acetic, lactic, citric, hydrochloric, phosphoric or the like of which acetic is the most preferred. Of course, other acidifying agents which hydrolyze to produce acid conditions in water such as, for example, acid salts (ie., $KH_2PO_4$), and which are acceptable for use in food processing may be employed in lieu of acid.

The volume of water employed in this process should be sufficient to result in a substantial softening of the starting material and extraction of non-proteinaceous solubles to enhance the protein content of the final dried product. Generally, water in volumes of about two parts water or more per part of the compacted proteinaceous seed meal material are operable and at least about 3 parts are preferred. From 2 to 5 parts water per part of starting material are preferred for normal operations.

The temperatures employed in this process range from about 105° C. to about 150° C., preferably from about 108° C. to about 130° C., and most preferably from about 108° C. to about 121° C.

The process is carried out under pressure and the pressures indicated are those of saturated steam. Generally, the pressures are from about 2.5 psig. to about 55 psig. (pounds per square inch gauge), preferably from about 5 to 15 psig.

The time of treatment varies from about 5 minutes to about 90 minutes, preferably from about 5 to about 45 minutes. The time of treatment is determined in part by the size of the piece, temperature and the pressures used. Generally the time required is inversely proportional to the temperature and pressure and directly proportional to the size of the piece. Thus, 4–10 mesh pieces at 2–15 psig. require about 5 minutes; pieces of $\frac{1}{4} \times 1 \times 1$ inch require about 15 minutes; and pieces or chunks measuring $\frac{1}{4} \times 2 \times 2$ or 3 inches require about 60 more minutes. Furthermore, it should be stated that the time and other conditions of treatment should be sufficient to enhance the protein content of the final product (on a dry weight basis) at least about 5% or preferably 10% more.

The product after treatment with water at elevated temperatures and pressures and at a given pH, is recovered from the liquor and drained and then may be reduced in moisture content. The product, if desired, may at this time be washed with water and/or other solvents such as alcohol or azeotropes to remove additional solubles prior to drying, although this is not required. Generally, a washing step is used where the volume of water employed in the process is not sufficiently large to extract all of the solubilized, essentially nonproteinaceous material (carbohydrate). The process of the present invention produces a product which, on a moisturefree basis, is reduced in toto to about 75 to 85 percent of the original weight.

The product, after washing and/or draining, may be reduced in moisture content by drying or equivalent procedure to from about 2 to 65 percent (by weight), preferably from 2 to 50 percent, depending on the desired character of the final material. A so-called dry product may range from about 2 to 14 percent moisture, preferably from 3 to 12 percent moisture. A product that is sold or used as a "moist" product has a moisture content of from 20 to 65 percent by weight, preferably 20 to 50 percent moisture.

The process of the present invention results in an extraction of solubles and a general swelling of the material to about twice or three times it original volume. There is no popping or production of cells by a rapid change in pressure. The product, is, however, relatively porous and readily absorbs fluid and is also, by virtue of that characteristic, readily rehydratable when placed in water. This porosity imparted to the products by the instant process is especially important where the products are subsequently employed as a proteinaceous component (either in whole or in part) of food products for human or animal consumption (such as dog food) which are subsequently retorted or sterilized in canning procedures. The porosity imparted has been found sufficient to permit proper heat penetration in the product to insure sterility or pasturization of the products.

The products of the present invention in their dry state may be impregnated with a variety of other materials such as, for example, fats, hydrolyzed vegetable protein, autolyzed yeast, egg albumen, flavors, spice oils, protein solutions, amino acids, single cell proteins, vitamins or the like.

One of the characteristics of the dried products of the present invention, especially those derived from defatted, dehulled compacted soybean meal, is that when the dried product has been rehydrated, it has physical properties when eaten that closely resemble the texture and mouth feel of meat. The original fibrous material present in the soybean product is essentially preserved. Furthermore, it has been found that the protein efficiency ratio of the protein material in the final product is practically unchanged. As indicated above, protein from soybeans or other proteinaceous vegetable materials which have been treated under alkaline conditions, such as by regeneration, including protein fiber spinning procedures, are severely modified and in some cases substantially lost in the process so that the protein efficiency ratio is lowered.

It has also been determined that the products produced by the process of the present invention have a sharply reduced bacterial contaminant liability which in some instances results in a substantially sterile material.

These products may be employed alone or mixed with other artificial or natural protein materials such as, for example, pieces of meat, fish protein, single cell protein, hydrolyzed vegetable protein, gravies, sauces, etc. The products produced herein when used alone or combined with other materials may be put through normal can cooking, sterilization or pasteurization processes and have sufficient structural integrity so as not to cook apart or turn into a mush.

In one alternative embodiment of this invention, it has been found possible to produce a moist product which has resistance to decomposition from adventitious bacteria. Such a product may be obtained by incorporating a small amount of a non-toxic, edible polyhydroxy alcohol having bacteriostatic properties in the water used in the process of this invention. Such polyhydroxy alcohols include propylene glycol, glycerol and butylene glycol. They are usually employed in the water used in the process in varying amounts. In a moist product which contains from 20 to 50 percent moisture, for example, the materials would be present in ratios of about 50% dry soybean material, 40% water and 10% propylene glycol. This glycol-containing product could be used as a so-called moist or chunky type dog food. Dry products having the same beneficial bacteriostatic properties would have as a typical ratio 85% dry soy material, 12% water and 3% propylene glycol.

swelling is essentially normal to that skin surface with some lateral swelling or distortion apparent at the portions of the piece above the skin surface.

DESCRIPTION OF THE PREFERRED EMBODIMENTS

In the following examples set forth in the table a compacted soy product produced by processing defatted, dehulled soy grits in an Anderson machine (Textrasoy) was used as a starting material. In general, after treatment, the products increase from an initial protein content of about 55% in the compacted soy product (on a moisture free basis) to from about 58 to about 62% protein on the same basis. This represents a protein enhancement of at least 10% on a moisture-free basis (MFB). The processing took place in a heated autoclave. Except where otherwise indicated, the water used was 800 ml. The time was about 30 minutes at 15 psig. saturated steam pressure (a temperature of about 121° C.). The pH of the water employed is shown in the third column. It should be noted that the use of larger amounts of acetic acid in examples 2–6 results in lower pH's in the preferred range and the final product recovered has lower moisture on drying and a higher protein content both on a dry and moisture-free basis. After treatment, the product was permitted to remain in the autoclave until the pressure fell to zero (usually no more than 15 minutes). The product was then recovered from the liquor, drained, weighed and dried overnight in a 90° C. oven.

TABLE

| Example No. | Start Wt. (gr.) | Start pH | Drained Wt. of Product | Final pH | Dried Wt. of Product gr. | Per Cent of start Wt. | % H₂O | Dried Product Protein (%) Dried | Moisture-Free Basis |
|---|---|---|---|---|---|---|---|---|---|
| 1 | 168 | 5.6 | 418 | 6.0 | 144 | 85.5 | 5.72 | 54.9 | 58.2 |
| 2 | 162 | 3.05 | 379 | 5.38 | 136 | 84.2 | 3.7 | 59.8 | 62.2 |
| 3 | 166 | 2.95 | 378 | 4.85 | 139 | 83.7 | 2.66 | 60.2 | 62.0 |
| 4 | 162 | 2.85 | 356 | 4.55 | 133 | 82.2 | 3.93 | 60.0 | 62.4 |
| 5 | 166 | 2.80 | 363 | 4.25 | 135 | 81.4 | 1.70 | 59.8 | 60.8 |
| 6 | 161 | 2.65 | 349 | 3.82 | 128 | 79.5 | 1.79 | 59.2 | 60.3 |

BRIEF DESCRIPTION OF THE DRAWING

Reference is made to the attached drawing wherein.

Figure 1:
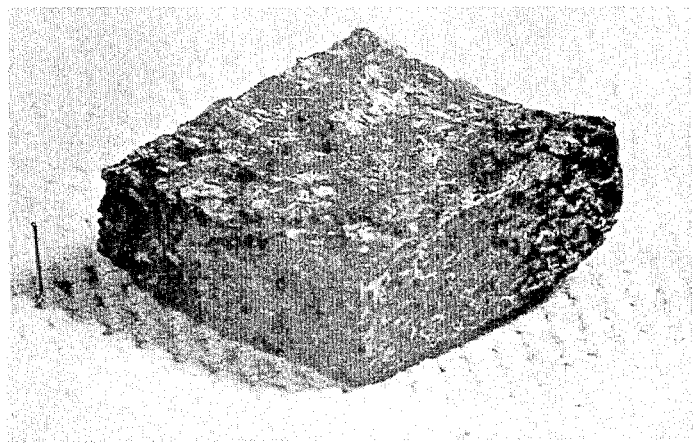
FIG. 1 is a photomicrograph depicting by about 2½ to 3× magnification a piece of compacted, defatted, dehulled soybean starting material of the type used in the present invention.
Figure 2:
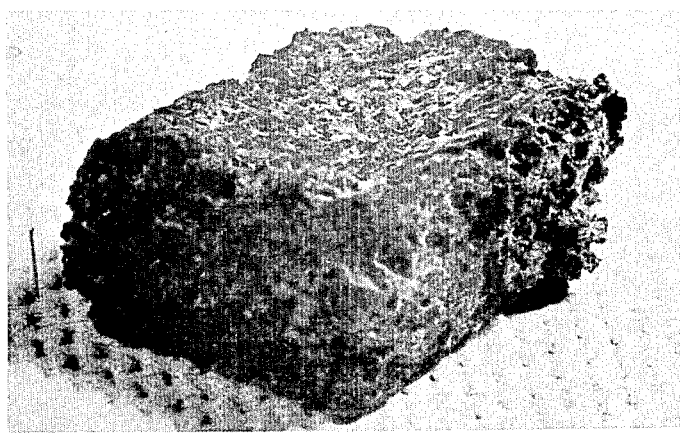
FIG. 2 is a photomicrograph depicting by 2½ to 3× magnification a piece of defatted, dehulled, compacted soybean material after treatment by the process of the present invention.

These photographs illustrate that the process of the present invention results in a swelling of the compacted essentially non-porous soybean material shown in FIG. 1 to produce the porous product illustrated in FIG. 2. As may be noted from an examination of FIG. 2, the final product contains a plurality of interstices or continuous cells which may be readily penetrated by heat and moisture in subsequent operations associated with preparation of foodstuffs, particularly conventional sterilization and/or canning methods. The porosity also permits the impregnation of the piece with other materials to produce a final consumer produce. It should be noted that in both photomicrographs the thin edge of the skin portion is apparent at the bottom edge of the piece. The swelling of the piece of FIG. 2 does not appreciably alter the size and shape of this skin and

EXAMPLE 7

In this example 320 grams of compacted soy product was placed in 1600 ml. of water containing ½% lactic acid (initial pH about 2.5). The water and compacted soy product was placed in an autoclave and heated at about 120° C. and at a pressure of about 15 psig. (saturated steam pressure) for a period of about 30 minutes. The autoclave was permitted to cool and the product recovered from the liquor (pH 4.4) and drained. The drained product recovered from the liquor had a moisture content of about 63% and, on a moisture-free basis, a protein content of about 65%. The moist product was seasoned, coated with a batter and fried in deep fat to produce a food product similar in shape to ravioli and, when eaten, had the texture and mouth feel of a meat product.

EXAMPLE 8

A Textrasoy compacted defatted, dehulled soybean product was placed in 800 ml. of a water solution containing ½% acetic acid (pH 2.8) and 5% propylene glycol. The mixture was subjected to 15 psig in an autoclave at about 120° C. for about 30 minutes. The product was recovered from the liquor, drained and then dried at 90° C. to a total volatile content of about 31.3% of which 6.85% was propylene glycol. On extended shelf storage in polyethylene bags, the product remained moist and free of mold or any evidence of bacterial decomposition. This product represents a typical moist dog food sold in packages which does not require sterilization for good shelf keeping qualities.

EXAMPLE 9

This example illustrates the results obtained by washing of the treated product after recovery from the liquor and draining. Products treated in ½% acetic acid solutions at 15 psig. (120° C.) for 30 minutes were washed with water and 95% ethanol. The following results were obtained:

|  | % Protein (Moisture Free) |
|---|---|
| Washed with Water | 64 |
| Washed with Alcohol | 68 |

The foregoing example illustrates that washing of the products obtained by treatment in accordance with the process of the present invention results in additional removal of non-proteinaceous solubles. Washing with ethanol is even more effective in removing the solubilized non-proteinaceous components as may be seen in the example wherein a protein content of 68% is achieved when calculated on a moisture-free basis. This, of course, may be contrasted with a normal protein content of 55% in the compacted soy product, again calculated on a moisture free basis.

The process of the present invention as may be understood from the foregoing example is broadly adapted to the production of food products high in protein content which have the structure and mouth feel of meat in the rehydrated or moist form. As pointed out previously, the dry products are quite porous and by virtue of this characteristic readily absorb moisture so that when wetted with water or other solutions such as aqueous solutions of fat or oils, spice oils, etc., they are rapidly converted to a form which may be consumed as a substitute meat-like product high in protein. Obviously there are many advantages to such a product in producing a relatively economical source of protein food. The product, when suitably colored to resemble cooked meat materials, may be utilized in preparing various meat simulating and meat-type products for human consumption such as, for example, chucks and other product shapes resembling meat either alone or when deep or batter fried, ground meat products such as, for example, an imitation hamburger, Mexican type foods such as tacos and the like, substituting in each instance the product of the present invention for meat in whole or in part. It has also been found that this product may be admixed with other meat proteins such as horse meat, beef trimmings, or the like and when suitably colored, is practically indistinguishable from the natural protein materials in the finally prepared form. A dog food utilizing the products of the present invention as a partial substitute for meat proteins has been prepared and had an appearance of an all-meat product.

One of the particular advantages of the process of this invention is that the protein efficiency ratio of the protein component is not appreciably altered by this processing and it provides a high efficiency food product at a relatively low cost. The porosity of the products, whether produced in a dry or moist form, permits rapid and efficient heat penetration to the center portions of these materials permitting normal can sterilization and cooking procedures. Such procedures cannot be followed using the compacted materials. Furthermore, it should be noted that the products of this invention are particularly free from typical beany flavors normally associated with seed meal derived materials.

What is claimed is:

1. A process for producing a proteinaceous food product having an enhanced protein content and the fibrous chewy texture of meat which comprises contacting a compacted, defatted protein-containing seed metal product in shard form characterized by the presence as one portion of the surface thereof of a densified, tough, at least partially denatured skin which is resistant to rehydration; with an aqueous solution having a pH of from about 2 to about 6.5, at temperatures above about 105° C. and at superatmospheric pressure, for a time sufficient to solubilize and extract a proportion of the non-proteinaceous component of said starting material, increase the relative protein content thereof and render the starting material substantially porous, and recovering the product from the resulting liquor.

2. A process according to claim 1 wherein the compacted defatted vegetable protein containing seed meal product is prepared from soybean meal.

3. The product of the process of claim 1.

4. A process according to claim 1 wherein the said pH is in the range of from about 2.3 to about 6.5.

5. A process according to claim 1 wherein the compacted defatted vegetable protein containing seed meal product is a soy product prepared by extrusion and compaction of soy material at pressures of from about 2,000 to 5,000 psi. and the moisture therein is converted to steam, thereby debittering the product in the extrusion-compaction step.

6. A process according to claim 1 wherein the said temperatures employed are in the range of from about 105° C. to about 150° C.

7. A process according to claim 1 wherein the volume of aqueous solution employed is at least 2 parts per part by weight of compacted defatted vegetable containing seed meal product.

8. A process according to claim 1 wherein the said superatmospheric pressure is between about 2.5 to about 55 psig. of saturated steam.

9. A process according to claim 1 wherein the densified skin has a thickness of up to about ⅛ inch.

10. A process according to claim 1 wherein the said contacting is carried out in the presence of saturated steam at pressures of from about 5 to 25 psig. and temperatures of from about 108° C. to 130° C.

11. A process according to claim 1 wherein the aqueous solution is employed in the range of from about 2 to 5 parts by weight per part by weight of compacted seed meal starting product.

12. The process according to claim 1 wherein the moisture content of the product is reduced after recovery from the liquor.

13. The process according to claim 1 wherein the moisture content of the product is reduced to between about 2 to 65% by weight after recovery from the liquor.

14. A process according to claim 1 wherein the recovered product is drained and dried to a moisture content of from 2 to 50% by weight.

15. A process according to claim 14 wherein the recovered product is dried to a moisture content of from 2 to 14 percent by weight.

16. A process according to claim 14 wherein the recovered product is dried to a moisture content of from 20 to 50 percent by weight.

17. A process according to claim 14 wherein the recovered product is dried to a moisture content of from 20 to 65 percent by weight.

18. A process according to claim 14 wherein the recovered product is washed with water or alcohol to remove non-proteinaceous solubles prior to drying.

19. A process according to claim 1 wherein said contacting is for a time period sufficient to solubilize a substantial portion of the non-proteinaceous components thereof to cause the protein content of the final product to be at least 10% greater than the starting product on a dry weight basis.

20. A process according to claim 1 wherein said contacting is for a period between about 5 and 90 minutes.

21. A process according to claim 1 wherein the compacted vegetable protein containing seed meal starting material is prepared from defatted, dehulled soybean meal and has a bulk density of from about 1.36 to about 1.40 grams per cubic centimeter.

22. A process according to claim 1 wherein the product recovered from the liquor is drained and dried to a moisture content of 2 to 14% and has a piece bulk density of from about 0.47 to about 0.7 g./cc.

23. A process according to claim 1 wherein acetic acid is employed to adjust the pH of the aqueous solution prior to said contacting to the acid range.

24. A method of preparing a quick-cooking protein food product which comprises palatable, meat-like in texture, chewable chunks when hydrated, comprising the steps of:
(a) subjecting proteinaceous feed selected from the group consisting of solvent-extracted meal and grits of proteinaceous seed material containing moisture to a mechanical pressure of at least 2000 pounds per square inch for a time and at a temperature sufficient to convert said moisture into steam whereby said proteinaceous feed is partially disembittered toasted and converted into a hard compacted mass;
(b) forming the mass into shards;
(c) heating the shards in hot water under superatmospheric pressure at a pH of about 2 to about 6.5 for a period of time sufficient in length to dissolve out soluble non-proteinaceous constituents and whereby the shards are softened to a chewable consistency; and
(d) separating the shards from said water containing said dissolved out soluble constitutents.

25. A method of preparing a proteinaceous food product having an enhanced protein content and the fibrous, chewy texture of meat which comprises contacting a compacted, defatted, protein-containing, disembittered, toasted and partially denatured seed meal material in hard shard form with sufficient hot water at superatmospheric pressure and at an acidic pH of from about 2 to about 6.5 for a sufficient period of time to dissolve out soluble, essentially non-proteinaceous materials, including flavor and odor causing materials, whereby the shards are softened to a chewable consistency, rendered porous, and the relative protein content is increased, and separating the softened, extracted shards from the said water containing the dissolved out, soluble constitutents.

26. A method of preparing a proteinaceous food product having an enhanced protein content and the fibrous, chewy texture of meat which comprises contacting a compacted, defatted, protein-containing, disembittered, toasted and partially denatured seed meal material in hard shard form with sufficient hot water at superatmospheric pressure at a pH of from about 2 to about 6.5 for a sufficient period of time to dissolve out soluble, essentially non-proteinaceous materials, including flavor and odor causing materials, whereby the shards are softened to a chewable consistency, rendered porous, and the relative protein content is increased, separating the softened, extracted shards from the said water containing the dissolved out soluble constituents, and reducing the moisture content of the extracted shards to from about 2 to about 65% moisture.

27. A method of preparing a proteinaceous food product having an enhanced protein content and the fibrous, chewy texture of meat which comprises contacting a compacted, defatted, protein-containing, disembittered, toasted and partially denatured seed material in hard shard form with sufficient hot water at superatmospheric pressure at a pH in the acid range of from about 2 to about 6.5 for a sufficient period of time to dissolve out soluble, essentially nonproteinaceous materials, including flavor and odor causing materials, whereby the shards are softened to chewable consistency, rendered porous, and the relative protein content is increased, separating the softened, extracted shards from the said water containing the dissolved out soluble constituents, washing the extracted shards with water to remove additional solubles, and reducing the moisture content of the treated and washed shards.

28. A method of preparing a quick-cooking protein food product, which comprises palatable, meat-like in texture, chewable chunks when hydrated, comprising the steps of:
(a) subjecting proteinaceous feed selected from the group consisting of solvent-extracted meal, grits, and flakes of a proteinaceous vegetable material containing moisture, to a mechanical pressure of at least 2000 pounds per square inch for a time and at a temperature sufficient to convert said moisture into steam whereby said proteinaceous feed is partially disembittered, toasted and compacted into a hard mass;
(b) fragmenting the mass into chunks;
(c) heating the chunks at superatmospheric pressure in hot water at a pH of about 2 to about 6.5 for a period of time sufficient in length to substantially extract and to dissolve out a substantial portion of the non-proteinaceous soluble constituents and whereby the chunks are softened to a chewable consistency;
(d) separating the chunks from said water containing said dissolved out soluble constitutents; and
(e) drying the chunks, whereby chunks are obtained which are cohesive, porous, high in protein and quick and easy to cook or prepare for consumption and which are chewable, meat-like in texture, and palatable when hydrated.

29. A method as claimed in claim 28 wherein the proteinaceous feed used in step (a) contains from about 3 to about 14 percent by weight moisture.

30. A method as claimed in claim 28 wherein said proteinaceous feed has a substantial available protein content.

31. A method as claimed in claim 28 wherein a pressure between 2000 and 5000 pounds per square inch is applied in step (a) at a temperature over 100° C.

32. A method as claimed in claim 28 wherein the proteinaceous feed is subjected to heat and pressure in step (a).

33. A method as claimed in claim 28 wherein the hot water in step (c) has a temperature of about 105° C. or above.

34. A method as claimed in claim 28 wherein the pH of the hot water in step (c) is obtained by the use of an acid selected from the group consisting of acetic, lactic, citric, hydrochloric and phosphoric acids.

35. A method as claimed in claim 28 wherein the chunks are heated in step (c) for between about 5 minutes and about 1½ hours.

36. A method as claimed in claim 28 wherein said hot water has a pH of about 6.5.

37. A method as claimed in claim 28 wherein the chunks are washed with water after step (d) but before step (e).

38. A method as claimed in claim 37 wherein said chunks are also washed with alcohol.

39. A method as claimed in claim 28 wherein the drying in step (e) is achieved by contacting the chunks with hot air.

40. A method as claimed in claim 28 wherein the drying step (e) is conducted until the final moisture content of the chunks is about 2 to about 14 percent by weight.

41. A method as claimed in claim 28 wherein said mass is fragmented into chunks which are at least about 4-10 mesh in size.

42. Chewable, meat-like palatable chunks obtained by hydrating the chunks obtained by the method of claim 41 in hot water.

43. Food formulations which include the dry chunks obtained by the method of claim 41.

44. Chunks which are cohesive, porous, palatable, quick and easy to cook or prepare for consumption and high in protein produced by the method of claim 28.

45. Canned food formulations which include the chunks of claim 44 in rehydrated form.

46. Pet food formulations which include the chunks of claim 44 in rehydrated form.

47. Food and feed formulations which include the chunks of claim 44 in rehydrated form.

48. A process wherein the chunks resulting from the method of claim 28 are hydrated by placing them in water whereby meat-like chunks are obtained.

49. A method of preparing a quick-cooking protein food product which comprises palatable, meat-like in texture, chewable chunks when hydrated, comprising the steps of:
 (a) subjecting proteinaceous feed selected from the group consisting of solvent-extracted comminuted proteinaceous seed material containing moisture, to a mechanical pressure of at least 2000 pounds per square inch for a time and at a temperature sufficient to convert said moisture into steam whereby said proteinaceous feed is partially disembittered, toasted and is compacted into a hard mass;
 (b) forming the mass into shards;
 (c) heating the shards in hot water at superatmospheric pressure at a pH of about 2 to about 6.5 for a period of time sufficient in length to dissolve out soluble non-proteinaceous constituents whereby the shards are softened to a chewable consistency;
 (d) separating the shards from said water containing said dissolved out soluble constitutents; and
 (e) drying the shards whereby shards are obtained which are cohesive, porous, high in protein and quick and easy to cook or prepare for consumption and which are chewable, meat-like in texture, and palatable when hydrated.

* * * * *

UNITED STATES PATENT AND TRADEMARK OFFICE
CERTIFICATE OF CORRECTION

PATENT NO. : 4,315,034

DATED : February 9, 1982

INVENTOR(S) : Arthur A. Levinson and Kenneth B. Basa

It is certified that error appears in the above-identified patent and that said Letters Patent are hereby corrected as shown below:

Column 3, line 56:

After the word "to" insert -- about 25 psig. and most preferably from about 5 to about --.

Column 8, line 12, Claim 1:

The first word "metal" should be -- meal --.

Signed and Sealed this

Third Day of May 1983

[SEAL]

Attest:

GERALD J. MOSSINGHOFF

Attesting Officer    Commissioner of Patents and Trademarks